(12) United States Patent
Whytock et al.

(10) Patent No.: US 10,930,101 B2
(45) Date of Patent: Feb. 23, 2021

(54) SELF-SERVICE TERMINAL (SST) SAFE AND METHODS OF OPERATING A LOCK FOR THE SST SAFE

(71) Applicant: NCR Corporation, Duluth, GA (US)

(72) Inventors: Alexander William Whytock, Scotland (GB); Brian Wotherspoon, Scotland (GB); Niraj Gopal, San Jose, CA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/470,300

(22) Filed: Aug. 27, 2014

(65) Prior Publication Data
US 2016/0063781 A1 Mar. 3, 2016

(51) Int. Cl.
| H04B 1/00 | (2006.01) |
| G07C 9/28 | (2020.01) |
| G07F 19/00 | (2006.01) |
| G07C 9/00 | (2020.01) |
| G06Q 20/18 | (2012.01) |
| E05B 47/00 | (2006.01) |
| E05B 65/00 | (2006.01) |

(52) U.S. Cl.
CPC ............ *G07C 9/28* (2020.01); *E05B 47/0001* (2013.01); *E05B 65/0075* (2013.01); *G06Q 20/18* (2013.01); *G07C 9/00* (2013.01); *G07C 9/00571* (2013.01); *G07C 9/00896* (2013.01); *G07C 9/00912* (2013.01); *G07F 19/202* (2013.01); *E05B 2047/0094* (2013.01); *G07C 9/0069* (2013.01)

(58) Field of Classification Search
CPC ...... G06Q 20/18; G07C 9/00; G07C 9/00111; G07C 9/00571; G07C 9/0069; G07C 9/00896; G07C 9/00912; G07C 9/28; G07F 19/202; E05B 2047/0094; E05B 47/0001; E05B 65/0075; E05B 47/00
USPC ........................................................ 340/5.61
See application file for complete search history.

(56) References Cited

U.S. PATENT DOCUMENTS

| 5,299,862 | A | * | 4/1994 | Rankine ................. G07F 17/12 109/26 |
| 6,409,086 | B1 | * | 6/2002 | Pellaumail .......... G07G 1/0018 235/462.13 |
| 7,413,118 | B2 | | 8/2008 | Kim |
| 9,232,400 | B2 | | 1/2016 | Singh et al. |
| 9,317,987 | B2 | | 4/2016 | Cleveland et al. |

(Continued)

FOREIGN PATENT DOCUMENTS

| CN | 101225726 A | 7/2008 |
| CN | 101375289 A | 2/2009 |

(Continued)

OTHER PUBLICATIONS

European Search Report in co-pending European patent application EP15181361.5 dated Jan. 12, 2016.

*Primary Examiner* — Naomi J Small
(74) *Attorney, Agent, or Firm* — NCR Corporation

(57) ABSTRACT

A Self-Service Terminal (SST) safe that includes a lock drive adapted and configured to i) operate inside the SST safe, ii) receive a wireless code sent from outside the SST safe, and iii) determine whether to lock or unlock the SST safe from inside the SST safe in response to the wireless code, and wherein the wireless code is cryptographically secured and authenticated prior to any unlock or lock operation.

10 Claims, 7 Drawing Sheets

(56) References Cited

U.S. PATENT DOCUMENTS

| | | | |
|---|---|---|---|
| 2001/0054025 A1* | 12/2001 | Adams, II | G06Q 10/08 705/50 |
| 2005/0193932 A1* | 9/2005 | Denison | E05G 1/04 109/59 R |
| 2005/0204787 A1* | 9/2005 | Ernst | G07C 9/00904 70/278.7 |
| 2007/0100771 A1* | 5/2007 | Eckleder | G06F 21/10 705/67 |
| 2008/0054649 A1* | 3/2008 | Ueda | H03K 17/94 292/216 |
| 2008/0150684 A1* | 6/2008 | Gartner | E05B 47/06 340/5.53 |
| 2009/0165682 A1* | 7/2009 | Cleveland | G06F 21/88 109/23 |
| 2009/0278426 A1* | 11/2009 | Vinke | E05B 1/0038 312/215 |
| 2011/0298584 A1* | 12/2011 | Biggs | G07C 9/00912 340/5.73 |
| 2011/0311052 A1 | 12/2011 | Myers et al. | |
| 2012/0229251 A1* | 9/2012 | Ufkes | E05B 47/0004 340/5.26 |
| 2012/0280783 A1* | 11/2012 | Gerhardt | H04W 12/003 340/5.6 |
| 2014/0068247 A1* | 3/2014 | Davis | H04L 9/3228 713/155 |
| 2014/0340196 A1* | 11/2014 | Myers | G07C 9/00309 340/5.61 |
| 2015/0356801 A1* | 12/2015 | Nitu | G07C 9/00904 340/5.61 |

FOREIGN PATENT DOCUMENTS

| | | |
|---|---|---|
| CN | 103314387 | 9/2014 |
| DE | 20201947 U1 | 6/2002 |
| EP | 1977362 A2 | 10/2008 |
| GB | 2395978 A | 6/2004 |
| GB | 2499191 | 8/2013 |
| JP | 2002-121943 | 4/2002 |
| WO | 2013/078561 A1 | 6/2013 |
| WO | 2014/035585 | 3/2014 |

* cited by examiner

SELF-SERVICE TERMINAL (SST) SAFE AND METHODS OF OPERATING A LOCK FOR THE SST SAFE

BACKGROUND

Some Self-Service Terminals (SSTs) include an internal safe for valuable items. For example, Automated Teller Machines (ATMs) require internal safes for securing cash that is stocked in the safes for dispensing to customers. Distributors, owners, and operators of the ATMs go to great expense in ensuring that their ATM safes are secure.

Thieves can be very ingenious and persistent in their attempts to retrieve and open ATM safes. Conventional ATM safes are equipped with expensive locks that are integrated with spindles and handles into the safe doors; deployment requires drilling holes into the front of the safe doors. Ironically, these holes provide opportunity for the safe to be breached by thieves. Moreover, the equipment itself that is added to the safe door (handle, etc.) is expensive and adds to the cost of manufacture.

Furthermore, the types of locks and related equipment can vary substantially. ATM distributors, owners, and operators have to make hard choices between increased security and cost and the decision can be complicated by the large number of choices available in the industry.

SUMMARY

In various embodiments, a safe and method of operating a lock of the safe are presented. The safe may be located in an SST, such as an ATM.

According to an embodiment, a SST safe is presented. Specifically, the SST safe includes a lock drive adapted and configured to i) operate inside the SST safe, ii) receive a wireless code sent from outside the SST safe, and iii) determine whether to lock or unlock the SST safe from inside the SST safe in response to the wireless code, and wherein the wireless code is cryptographically secured and authenticated prior to any unlock or lock operation.

DETAILED DESCRIPTION

Figure 1A:
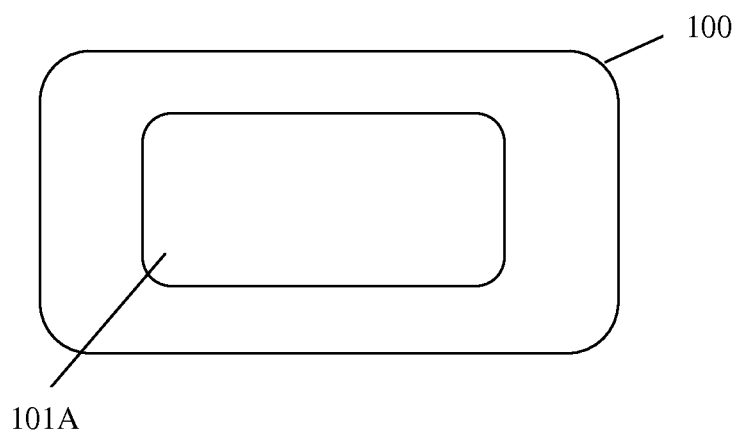
FIG. 1A is a diagram of an outside view of a Self-Service Terminal (SST) safe, according to an example embodiment.

FIG. 1A is a diagram of an outside view of a Self-Service Terminal (SST) safe 100, according to an example embodiment.

Although not depicted in the FIG. 1A, the safe 100 is incorporated and securely mounted within an SST and houses valuable media, such as currency, checks, gift certificates, value tickets, coupons, goods, and the like.

The safe 100 includes a safe door 101A from which the safe 100 can be accessed to remove the valuable media and/or replenish the safe 100 with valuable media.

Notably, the safe door 101A is devoid of any handle other than that is used for opening the safe door 101A (any handle present does not unlock the safe door) and there are no holes through the safe door 101A for lock spindle/handles.

Figure 1B:
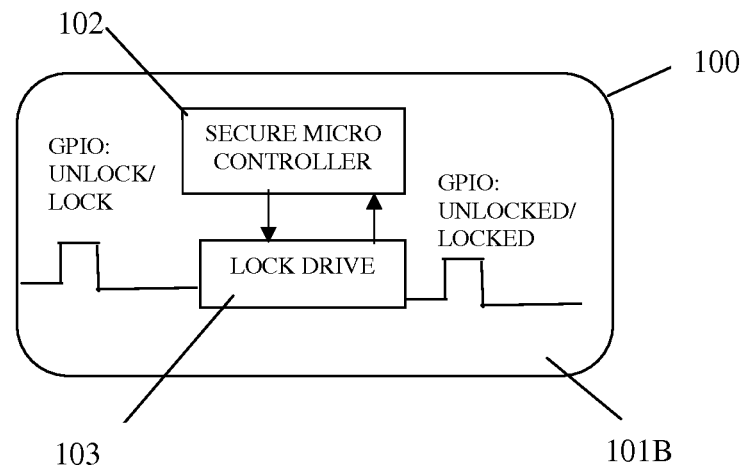
FIG. 1B is a diagram of an inside view of a SST safe, according to an example embodiment.

FIG. 1B is a diagram of an inside view of a SST safe 100, according to an example embodiment.

Inside the safe 100 a variety of electromechanical components exists: a secure microcontroller 102, a lock drive 103 and, perhaps, a General Purpose Input/Output (GPIO) chip for locking and unlocking the safe door 101A on direction of the lock drive 103.

The components shown in the FIG. 1B are depicted as being situated on the inside of the safe door 101B. It is noted that this does not have to be the only configuration. That is the components can exists in whole or in part on the inside walls, ceiling, and/floor of the safe 100. Moreover, the components may be covered with material from within the safe 100 so as to prevent damage to the components.

Figure 1C:
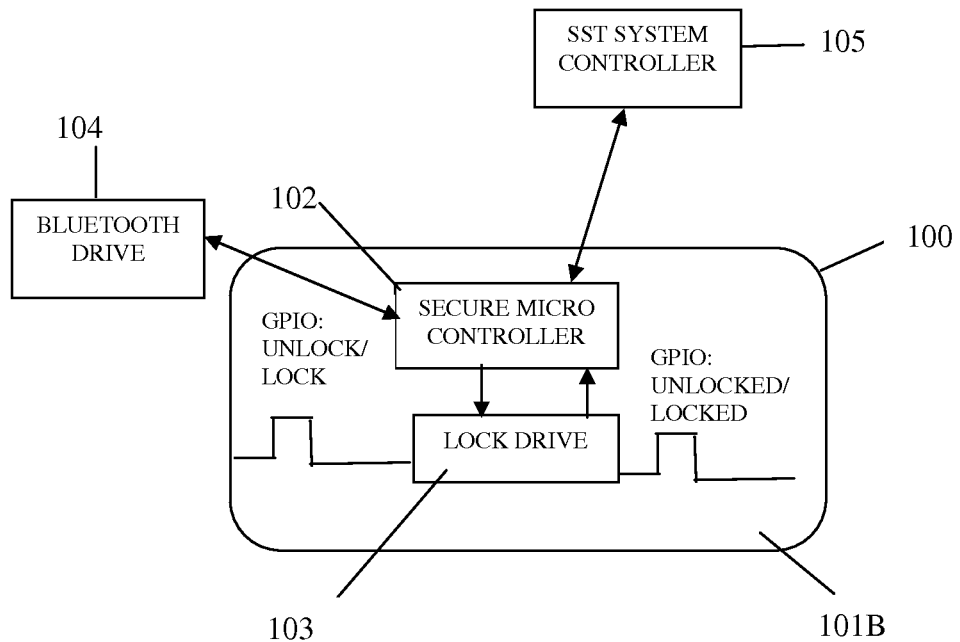
FIG. 1C is a diagram of interacting with the SST safe to lock and unlock the SST safe, according to an example embodiment.

FIG. 1C is a diagram of interacting with the SST safe 100 to lock and unlock the SST safe 100, according to an example embodiment.

The secure micro controller 102 provides cryptographic processing for the lock drive 103, which activates the GPIOs to lock and unlock the safe door 101B from the inside of the safe 100. Cryptographic communication and keys supplied from the secure micro controller 102 are supplied to the lock drive 103 to lock and unlock the SST safe 100. Communication to the lock drive 103 can occur via a Universal Serial Bus (USB) connection between the lock drive 103 and the SST system controller 105. Moreover, communication can occur wirelessly via a Bluetooth® drive 104 (which assumes the lock drive 103 also includes a Bluetooth® transceiver not shown in the FIG. 1C).

Figure 1D:
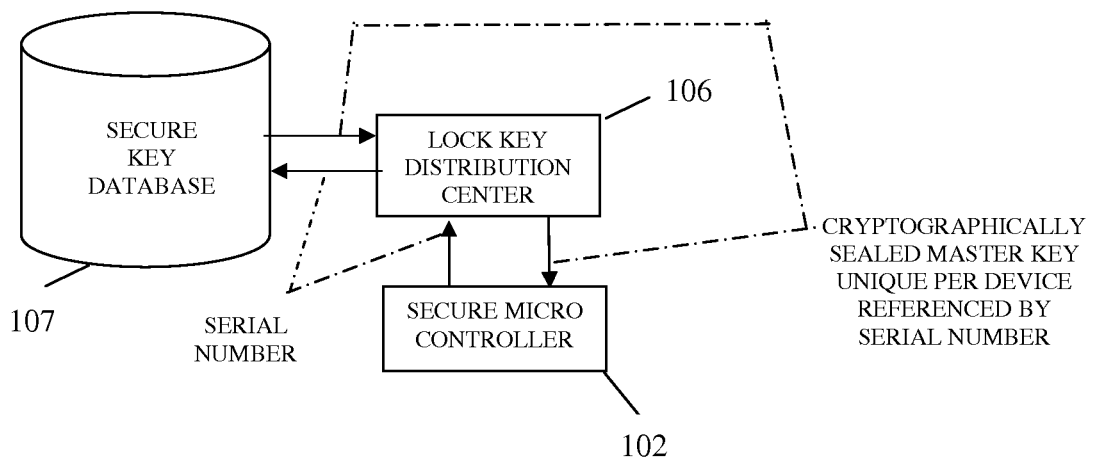
FIG. 1D is a diagram of interacting with the SST safe to acquire key information, according to an example embodiment.

FIG. 1D is a diagram of interacting with the SST safe 100 to acquire key information, according to an example embodiment.

FIG. 1D illustrates an example embodiment of the invention for the secure micro controller 103 to acquire its master key from a secure key database 107 through an external lock distribution center 106 that interacts with the secure key database 107. In this embodiment, the secure micro controller 102 generates a public/private key pair. Next, the secure micro controller 102 provides its public key and serial number to the lock key distribution center 106. The lock key distribution center 106 derives a unique master key for the secure micro controller 102 from the serial number and then stores just the serial number for the secure microcontroller in the secure key database 107 (it is to be noted that the unique master key (unique to the secure micro controller 102, and based on its serial number) is not stored in the secure key database 107. The lock key distribution center 106 encrypts the master key using the public key of the secure micro controller 102 and sends back the encrypted master key to the secure micro controller 102. The secure micro controller 102 then decrypts the encrypted master key using its private key and stores the decrypted master key within the secure micro controller 102 for future use. The secure micro controller 102 maintains complete control and access to its private key and the decrypted master key and it is not accessible outside the secure micro controller 102.

It is noted that other cryptographic techniques can be used to ensure that the master key acquired from the secure micro controller 102 during initialization with the lock key distribution center 106 is not exposed or compromised while on any network communication wire and the lock key distribution center 106 does not retain or store that master key. One such other technique is discussed below with reference to the FIGS. 2-4.

Figure 1E:
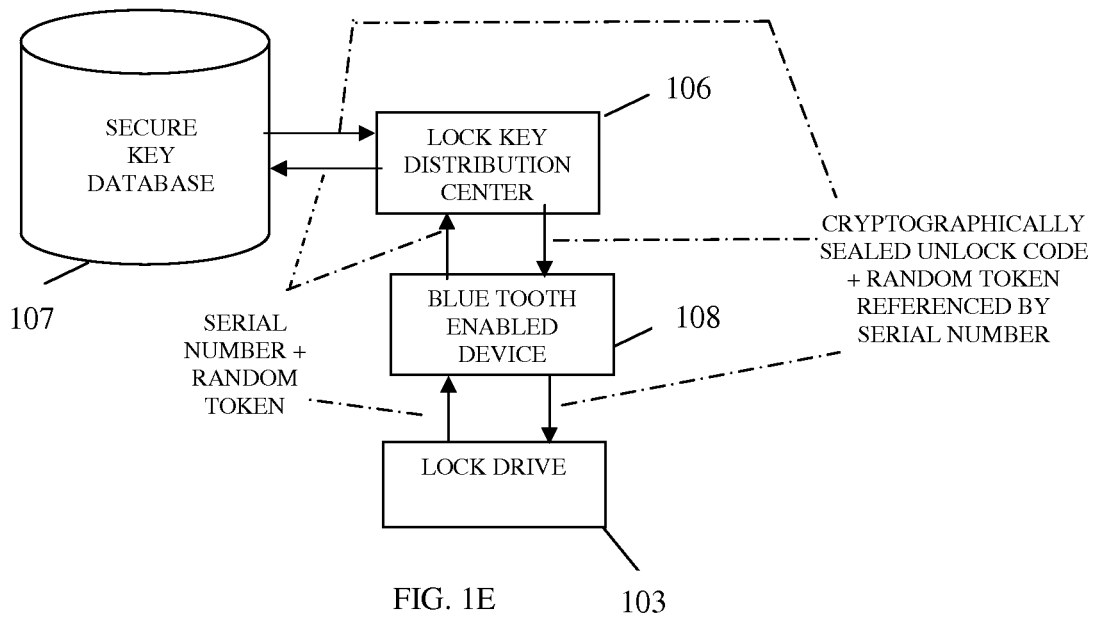
FIG. 1E is a diagram of interacting with the SST safe by a Bluetooth® enabled device, according to an example embodiment.

FIG. 1E is a diagram of interacting with the SST safe 100 by a Bluetooth® enabled device 108, according to an example embodiment.

According to an unlock access embodiment, a Bluetooth® enabled device 108 makes a wireless connection to the lock drive 103 or the SST system controller 105 to acquire the serial number of the safe 100 and a random token. The Bluetooth® enabled device 108 communicates this to the lock key distribution center 106 (either via a mobile app or by a phone call to a help center associated with the lock key distribution center 106). The lock key distribution center 106 (either automatically via a software process or by manual entry by a help desk person) supplies the serial number and random token (associated uniquely with the unlock transaction being conducted) to the secure key database 107. The secure database 107 returns a cryptographically sealed unlock code plus the random token referenced by the serial number. That is, the random token is based on the serial number for the safe 100. The Bluetooth® enabled device 108 enters the encrypted code plus random token either directly supplying via a mobile app to the lock drive 103 or via an interface associated with the SST system controller 150. The secure micro controller 102 validates the encrypted information and the random token on behalf of the lock drive 103, and if valid the lock drive 103 unlocks the safe door 101A for access.

Figure 1F:
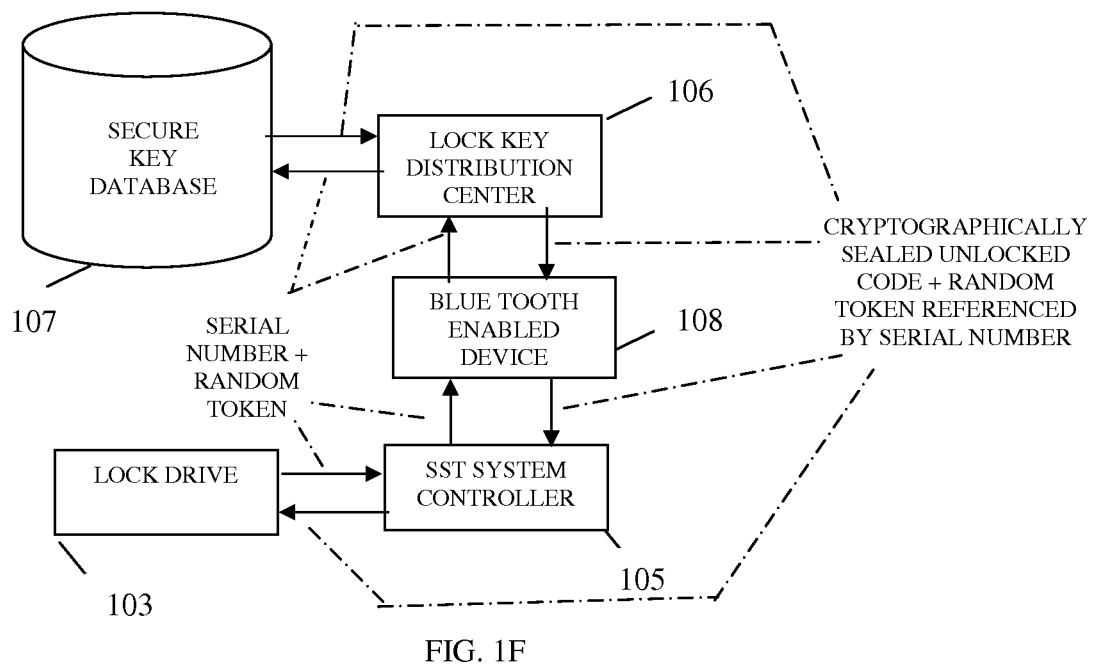
FIG. 1F is a diagram of interacting with the SST safe by a SST system component, according to an example embodiment.

FIG. 1F is a diagram of interacting with the SST safe 100 by a SST system component, according to an example embodiment.

FIG. 1F shows a similar situation to FIG. 1E only the Bluetooth® enabled device 108 interacts with the SST system controller 102 directly and not the lock drive 103 to access the SST safe 100. This was discussed above with reference to the FIG. 1E as well as an alternative operational scenario for unlocking the safe 100.

It is noted that the operator of the Bluetooth® enabled device is also validated and may include a customer engineer that services the SST or a replenisher that is authorized to replenish the safe 100. A variety of additional authentication mechanisms can be used to authenticate the customer engineer or replenisher and their devices (if using a Bluetooth® enabled device 108 or directly accessing an interface of the SST system controller 102).

Moreover, in an embodiment, the wireless communication is through Bluetooth® Low Energy (LE) and the devices communicating wirelessly use Bluetooth® LE.

Additionally, in other embodiments, the wireless transmission need not be Bluetooth® as any short-range wireless transmission can be used.

Moreover, the variations on the cryptology used to wirelessly communicate with the safe 100 can vary, and some of these variations are discussed herein and below with other embodiments of cryptographically operating the safe 100 wirelessly.

Figure 2:
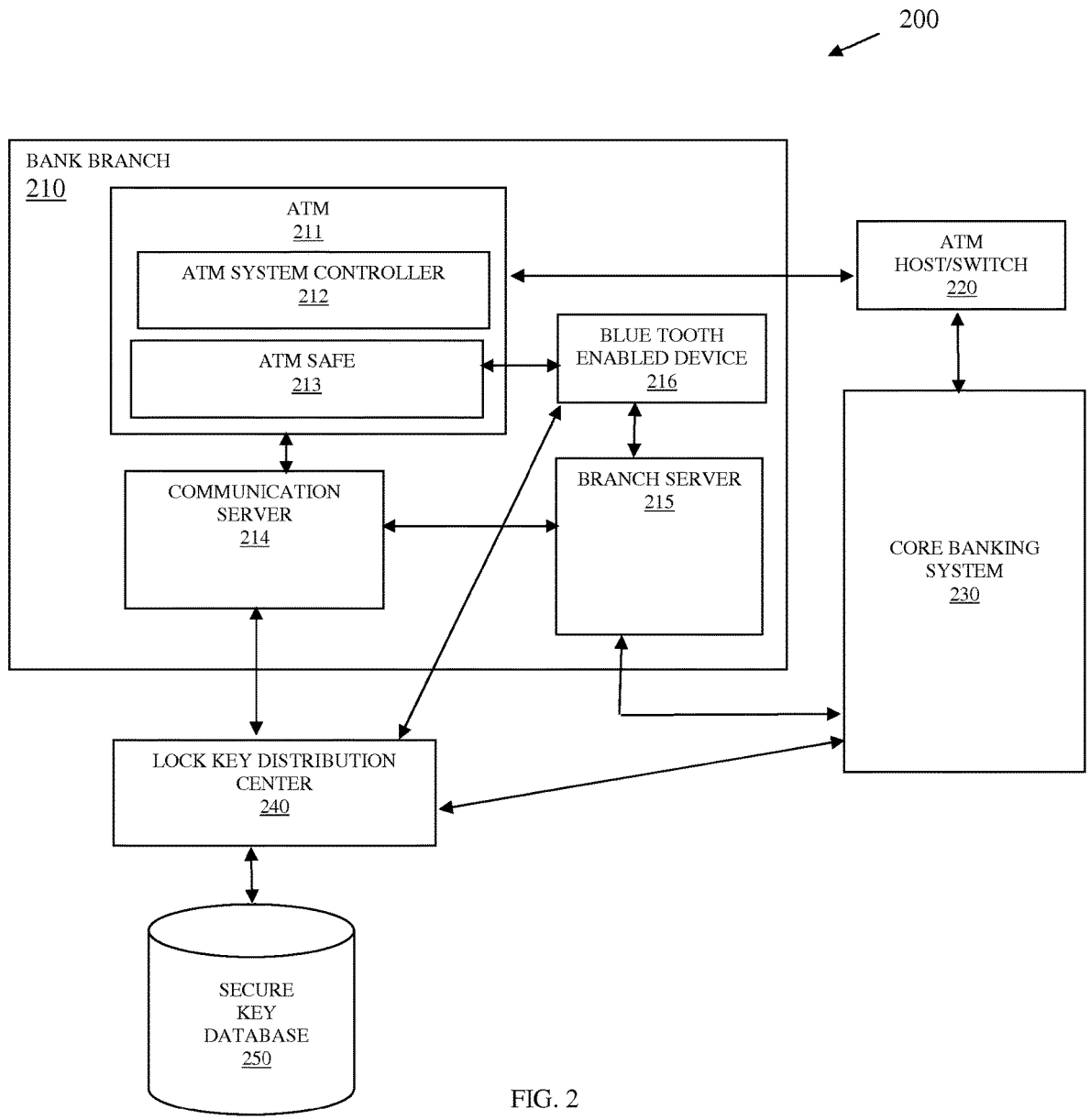
FIG. 2 is a diagram of a bank branch that incorporates a SST safe into an ATM, according to an example embodiment.

FIG. 2 is a diagram 200 of a bank branch 210 that incorporates a safe 213 into an Automated Teller Machine (ATM) 211, according to an example embodiment. It is to be noted that the components are shown schematically in greatly simplified form, with only those components relevant to understanding of the embodiments being illustrated.

Furthermore, the various components (that are identified in the FIG. 2) are illustrated and the arrangement of the components is presented for purposes of illustration only. It is to be noted that other arrangements with more or less components are possible without departing from the teachings of SST safe and methods of operating a lock of the SST safe, presented herein and below.

The diagram 200 includes a bank branch 210, an ATM host/switch 220, a core banking system 230, a lock key distribution center 240, and a secure key database 250. The bank branch 210 includes an ATM 211 (having an ATM system controller 212 and an ATM safe 213), a communication server 214, and a branch server 215. The core banking system 130 includes a remote teller manager 131.

During operation, a customer operating the ATM 211 to conduct a transaction to deposit or receive cash from the ATM 211 makes a network connection with a remote ATM host/switch 220 that routes transaction details along with approval or denial through the core banking system 230. Tellers can assist with transactions or with customers through modes of operation for the ATM 211 that routes transaction details through the communication server 214 to the branch server 215 and to tellers (remote or local and not depicted in the diagram 200). Tellers can perform authorizations and overrides through the branch server 215 connected to the core banking system 230.

When the ATM safe 213 is in need of replenishment or in need of service from a customer engineer, a conventional ATM safe would entail opening the ATM 211 outer compartment and with proper authorization and physical keys opening a safe door. This is changed with the teachings presented herein.

Specifically, the ATM safe 213 is accessed in one of two manners. The first manner is through a replenisher or customer engineer (CE) interacting with an administrative interface of the ATM 211 to communicate with the ATM system controller 212 or interacting with the ATM system controller 212 through a short-range wireless communication, such as Bluetooth® Low Energy (LE), using a Bluetooth® enabled device 216.

The second manner is direct communication with the ATM safe 213 through the Bluetooth® enabled device 216 (phone, tablet, laptop, wearable processing device, etc.).

In each manner of communication to unlock and lock the ATM safe 213, a lock drive of the ATM safe 213 is contacted (either through the ATM system controller 212 or directly from the Bluetooth® enabled device 216) to acquire a serial number and in some cases a random number from the ATM safe 213 (by the lock drive 103 using its secure micro controller 102). This is then communicated from the Bluetooth® enabled device 216 to the lock key distribution center 240. The lock key distribution center 240 supplies the serial number, the random number, and, perhaps a device identifier and other credentials of the replenisher or CE to the secure key database 240. A cryptographic access code with the random number is returned to the Bluetooth® enabled device 216. The replenisher or CE then uses a mobile application to communicate the cryptographic code and random number to the lock drive 103 or through an interface to the ATM system controller 212 that is then delivered to the lock drive 103 of the ATM safe 213. Assuming the cryptographic code and random number are verified by the secure micro controller 102, the safe door 101A is unlocked electronically from the inside of the safe door 101B. The modules and interaction for achieving this was discussed above with reference to the FIGS. 1A-1F.

The ATM safe 213 has no access from the outside of the safe door 101A. Locking and unlocking of the ATM safe door 101A occurs from the components and processing occurring entirely from within the inside of the ATM safe 213.

It is noted that for added security, the Bluetooth® pairing code between the Bluetooth enabled device 216 and the ATM system controller 212 or the lock drive 102 must be known by the lock drive 102 and the replenisher or the CE. This pairing code can change with a configured periodicity for even added security. The pairing codes are closely guarded by the ATM distributor, operator, or owner.

In an embodiment, the cryptographic processing uses a derived unique key per transaction (DUKPT) scheme with Advance Encryption Standards (AES). Each unique ATM safe 211 has its lock drive 103 seeded with an initial PIN encryption key (IPEK) with the secure micro controller 102 during manufacture of the ATM safe 211. Each attempt to open the lock drive 103 requires a code to be generated by retrieving a current key serial number from the lock drive 103 via the secure micro controller 102 and the current key serial number is transmitted to the lock key distribution center 240 along to the secure key database 250. The secure key database 250 then derives a current key Message Authentication Code (MAC) and calculates an AES MAC over the identifier associated with the replenisher or the CE conducting the transaction, and perhaps, a work order number supplied by the replenisher or the CE. The cryptographic operations are performed within a hardware security module (HSM) on the secure key database 250 and on the ATM safe 211 via the secure micro controller 102. What results is a 16 byte MAC that includes three sections: section one includes bytes 1 through 5 and represent an open or unlock code that must be supplied to the lock drive 103 to open the ATM safe 211, section two includes the next five bytes beginning at byte 6 and this represents a close code that is sent back from the lock drive 103 to allow the secure key database 250 to verify the ATM safe 211 locked, section three includes the next 5 bytes, which are cached by the lock drive 103 and the secure key database 250 to be used as the pairing passcode for the next attempt to connect to the lock drive 103 (the first attempt is the initial key serial number without the transaction counter). The lock drive 103 may also independently require the replenisher or CE identifier with the unlock code to achieve unlocking of the ATM safe 211 (two-factor authentication—the unlock code from the secure key database 250 and the identifier from the replenisher or the CE). This approach eliminates the need to store large volumes of symmetric keys on the secure key database 250; a single base key (using DUKPT) can allow current unique keys on transactional bases to be derived for thousands of lock drives associated with thousands of ATMs. Unauthorized users are prevented from even connecting to the lock drive 103. Moreover, each DUKPT current key allows for one million future unique key usages before it needs to be replaced, which is more than the lock drive 103 will likely receive during its entire lifetime so there is no need to re-seed on any regular interval. The pairing codes is never transmitted to or from the lock drive 103 and is not available outside of the secure key database 250 until a next connection attempt is made to the lock drive 103. Finally, a single cryptographic operation provides all three needed codes (unlocking, locking, and deriving the next pairing code).

In an embodiment, the ATM safe 211 is the SST safe 100.

In an embodiment, the lock key distribution center 240 is the lock key distribution center 106.

In an embodiment, the secure key database 250 is the secure key database 107.

In an embodiment, the secure key distribution center 240 and the secure key database 250 operated as a single combined entity, such as a central host.

Some of embodiments of the FIGS. 1A-1F and FIG. 2 along with other embodiments are now discussed with reference to the FIGS. 3-5.

Figure 3:
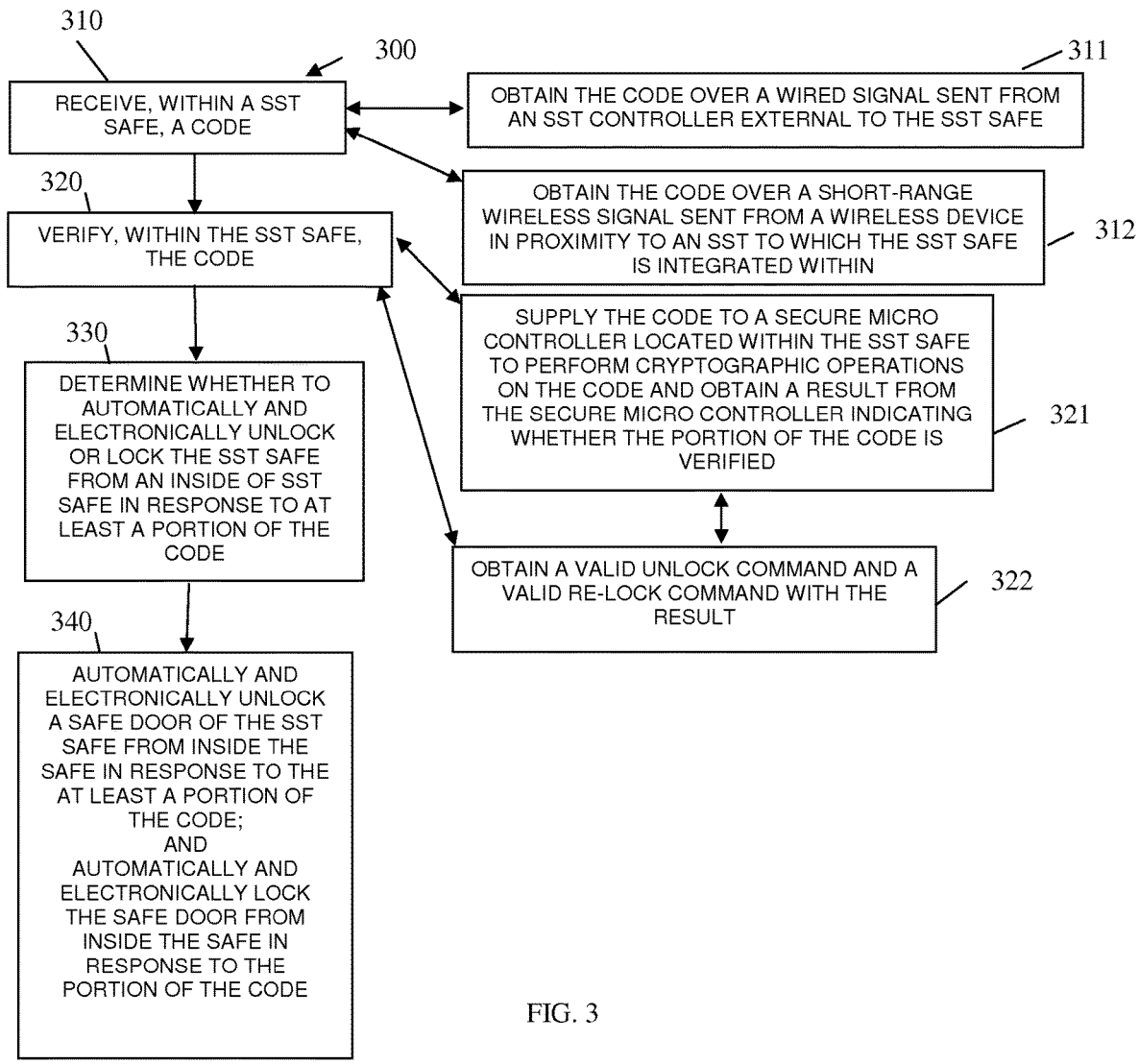
FIG. 3 is a diagram of a method for wirelessly operating a SST safe, according to an example embodiment.

FIG. 3 is a diagram of a method 300 for wirelessly operating a SST safe, according to an example embodiment. The software module(s) that implements the method 200 is referred to as a "safe controller." The safe controller is implemented as executable instructions programmed and residing within memory and/or a non-transitory computer-readable (processor-readable) storage medium and executed by one or more processors of a Self-Service Terminal (SST) safe. The processor(s) of the SST safe that executes the safe controller are specifically configured and programmed to process the safe controller. The safe controller has access to one or more network connections during its processing. The network connections can be wired, wireless, or a combination of wired and wireless.

In an embodiment, the SST safe that executes the safe controller is the SST safe 100.

In an embodiment, the SST safe that executes the safe controller is the ATM safe 213.

In an embodiment, the safe controller is the lock drive 103.

In an embodiment, the safe controller is a combination of the secure micro controller 102 and the lock drive 103.

The processing of the transaction controller assumes initial key methodology and initialization as discussed above between the SST safe (having the transaction controller) and a central host (remote host from the SST). Moreover, the methodology and in some cases some keys are prefabricated (including configuration) into the components of the SST.

At 310, the transaction controller receives, within the SST safe, a code. The code can be encrypted and/or digitally signed. The code is transaction based meaning it is good for a single transaction with the SST safe and the code is not repeated for other transactions occurring with the SST safe.

According to an embodiment, at 311, the transaction controller obtains the code over a wired signal sent from an SST controller that is external to the SST safe and perhaps interfaced via a USB connection.

In an embodiment, at 312, the transaction controller obtains the code over a short-range wireless signal (such as Bluetooth® and others) send from a wireless device (phone, tablet, laptop computer, wearable processing device, and the like), which is in proximity to an SST. The SST safe having the transaction controller processing therein is integrated into the SST.

At 320, the transaction controller verifies, within the SST safe, the code for access to the SST safe or for an operation to be performed on the SST safe.

In an embodiment, at 321, the transaction controller supplies the code to a secure micro controller located within the SST safe to perform cryptographic operations on the code and obtain a result from the secure micro controller, which indicates whether at least a portion of the code is verified. Some cryptographic functions of the secure micro controller that are performed on codes on behalf of a lock drive was presented above with reference to the FIGS. 1A-1F and FIG. 2.

In an embodiment of 321 and at 322, the transaction controller obtains a valid unlock command and a valid re-lock command with the result. The transaction controller may also cache a portion of the result for use in generating a next cryptographic key associated with a next transaction-based code supplied to the SST safe. This scenario was discussed above with reference to the FIG. 2.

At 330, the transaction controller determines whether to automatically and electronically unlock or lock the SST safe in response to at least a portion of the code (which may be cryptographically transformed as well during the determination as discussed above).

The SST safe is unlocked and locked entirely and completely from the inside of the SST safe. The SST safe includes no holes in the SST safe door used for unlocking the SST safe. Locking and unlocking the safe must occur via electronic communication with the transaction controller located and processing within the inside of the SST safe.

According to an embodiment, at 340, the transaction controller automatically and electronically unlocks the safe door from inside the safe in response to the at least a portion of the code and/or the transaction controller automatically and electronically locks the safe door from inside the safe in response to the at least a portion of the code or another portion of that code (as discussed above).

Figure 4:
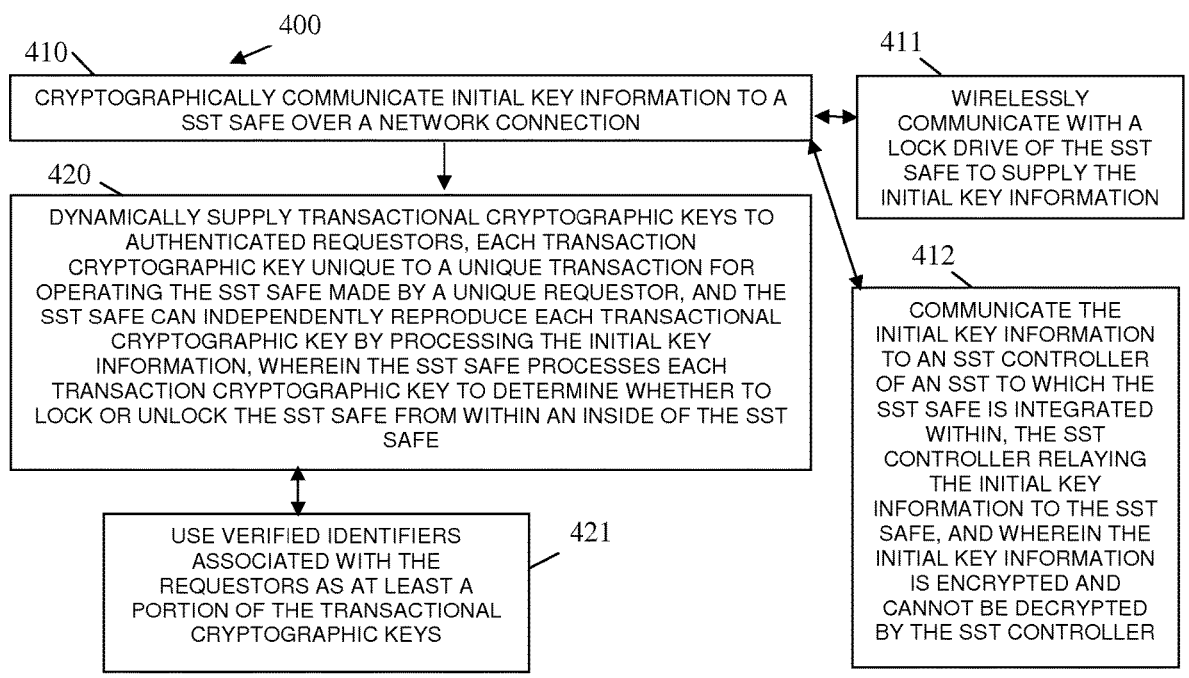
FIG. 4 is a diagram of another method for wirelessly operating a SST safe, according to an example embodiment.

FIG. 4 is a diagram of another method 400 for wirelessly operating a SST safe, according to an example embodiment. The software module(s) that implements the method 400 is referred to as a "safe host controller." The safe host controller is implemented as executable instructions programmed and residing within memory and/or a non-transitory computer-readable (processor-readable) storage medium and executed by one or more processors of one or more devices. The processors that execute the safe host controller are specifically configured and programmed to process the safe host controller. The safe host controller has access to one or more network connections during its processing. The network connections can be wired, wireless, or a combination of wired and wireless.

In an embodiment, the device that executes the safe host controller is a server.

In an embodiment, the safe host controller is the lock key distribution center 106.

In an embodiment, the safe host controller is lock key distribution center 240.

In an embodiment, the safe host controller is the secure key database 107.

In an embodiment, the safe host controller is the secure key database 250.

In an embodiment, the safe host controller is a combination of the lock key distribution center 106 and the secure key database 107.

In an embodiment, the safe host controller is a combination of the lock key distribution center 240 and the secure key database 250.

At 410, the safe host controller cryptographically communicates initial key information to a SST safe over a network connection. This is initialization and synchronization between the SST safe and the safe host controller that processes on a remote host, remote from the SST to which the SST safe is integrated within.

According to an embodiment, at 411, the safe host controller wirelessly communicates with a lock drive of the SST safe to supply the initial key information.

In an embodiment, at 412, the safe host controller communicates the initial key information to an SST controller of an SST to which the SST safe is integrated within. The SST controller relaying initial key information to the SST safe over a wired connection. The initial key information is encrypted and cannot be decrypted or deciphered by the SST controller.

At 420, the safe host controller dynamically supplies transactional cryptographic keys to authenticated requestors (such as replenishers or CEs). Each transaction cryptographic key unique to a unique transaction for operating the SST safe made by a unique requestor. Moreover, the SST safe can independently reproduce each transactional cryptographic key by processing the initial key information. Furthermore, the SST safe processes each transaction cryptographic key to determine whether to lock or unlock the SST safe from within an inside of the SST safe.

According to an embodiment, at 421, the safe host controller uses verified identifiers associated with the requestors as at least a portion of the transactional cryptographic keys.

Figure 5:
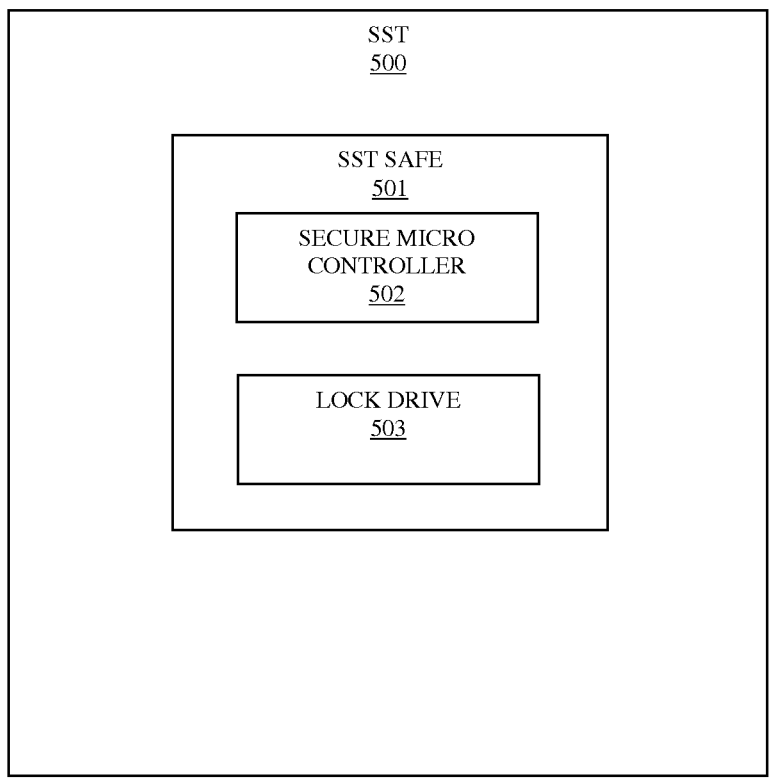
FIG. 5 is a diagram of an SST safe, according to an example embodiment.

FIG. 5 is a diagram of an SST safe 501, according to an example embodiment. The SST safe 501 includes a variety of hardware components and software components. The software components of the SST safe 501 are programmed and reside within memory and/or a non-transitory computer-readable medium and execute on one or more processors of an SST safe 501. The SST safe 501 communicates one or more networks, which can be wired, wireless, or a combination of wired and wireless.

In an embodiment, the SST safe 501 is the SST safe 100.

In an embodiment, the SST safe 501 is a component of the ATM safe 213.

In an embodiment, the processing and embodiments discussed above with respect to the SST safe 100, the ATM safe 213, and the method 300 are processed by the components of the SST safe 501 and are embodiments of the SST safe 501.

The SST safe 501 is integrated within an SST 500.

In an embodiment, the SST 500 is the ATM 211.

In an embodiment, the SST 500 is a gaming machine.

In an embodiment, the SST 500 is a kiosk.

In an embodiment, the SST 500 is a Self-Service Checkout Station.

In an embodiment, the SST 500 is a Point-Of-Sale (POS) device.

The SST safe 501 includes a lock drive 503.

The lock drive 503 is a combination of electromechanical hardware and software components. The lock drive 503 is adapted and configured to: operate entirely within an inside of the SST safe 501, receive a wireless code sent from outside the SST safe 501, and determine whether to lock or unlock the SST safe 501 in response to at least a portion of the wireless code.

In an embodiment, the lock drive 503 is the lock drive 103 of the FIGS. 1A-1F and the FIG. 2 and the operations discussed above with respect to the lock drive 103 are incorporated by reference herein with the secure micro controller 501.

In an embodiment, the lock drive 503 is adapted to perform any of the processing discussed above with respect to the method 300; thus, embodiments and processing associated with the method 300 are incorporated by reference herein with the lock drive 503.

In an embodiment, the lock drive 503 is further adapted and configured to disengage a lock shaft to free an access door to open when the at least a portion of the wireless code is verified as a valid unlock code.

In an embodiment, the lock drive 503 is further adapted and configured to engage a lock shaft to secure an access door to shut and lock when at least a portion of the wireless code is verified as a valid lock code.

In an embodiment, the lock drive 503 is further adapted and configured to obtain both a valid lock code and a valid unlock code from the wireless code for a single access transaction to the SST safe 501.

In yet another embodiment, the lock drive 503 is further adapted and configured to send a confirmation to a remote host when the SST safe 501 is locked after having been unlocked or unlocked after having been locked.

According to an embodiment, the lock drive 503 is further adapted and configured to receive the wireless code from a SST system controller over a wired connection. The wireless code acquired wirelessly by the SST system controller from a short-range wireless transmission of a wireless device in proximity to the SST 500. In another case, the wireless code is received wirelessly by the wireless device and an interface of the SST 500 is used by a replenisher or CE to enter the wireless code into the interface for acquisition by the SST system controller.

In an embodiment, the lock drive 503 is further adapted and configured to directly receive the wireless code from a short-range wireless transmission of a wireless device in proximity to the SST 500.

In an embodiment, the lock drive 503 is further adapted and configured to accept the wireless code when a wireless device in proximity to the SST 500 provides a valid wireless pairing code recognized by the lock drive 503.

According to an embodiment, the SST safe 501 also includes a secure micro controller 502. The secure micro controller 502 is adapted and configured to operate entirely within the SST safe 501, perform cryptographic operations on the wireless code on behalf of the lock drive 503.

In an embodiment, the secure micro controller 501 is the secure micro controller 102 of the FIGS. 1A-1F and the FIG. 2 and the operations discussed above with respect to the secure micro controller 102 are incorporated by reference herein with the secure micro controller 501.

In an embodiment, the SST safe 501 includes an access door to the SST safe 501 that is devoid of any holes used for unlocking the SST safe 501 and/or handles used for unlocking the SST safe 501.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   obtaining, by a Self-Service Terminal (SST) safe, an encrypted master key over a network connection;
   providing, by the SST safe, the encrypted master key to a secure micro controller within the SST safe for decrypting the master key with a private key of the SST safe maintained within the secure micro controller;
   receiving, completely within the SST safe, a code and a user identifier;
   verifying, completely within the SST safe, the code by the secure micro controller processing the code and comparing against the decrypted master key;
   determining completely within the SST safe whether to automatically and electronically unlock or lock the SST safe from an inside of SST safe based on two-factor authentication that includes at least a portion of the code and the user identifier; and
   providing access to the SST when the SST safe is unlocked through a safe door having a handle, wherein the safe door is devoid of any holes for affixing the handle to the safe door.

2. The method of claim 1, wherein receiving further includes obtaining the code over a wired signal sent from an SST controller external to the SST safe.

3. The method of claim 1, wherein receiving further includes obtaining the code over a short-range wireless signal sent from a wireless device in proximity to an SST to which the SST safe is integrated within.

4. The method of claim 1, wherein verifying further includes supplying the code to the secure micro controller located within the SST safe to perform cryptographic operations on the code and to compare against the decrypted master key, and obtaining a result from the secure micro controller indicating whether the at least a portion of the code is verified.

5. The method of claim 4, wherein obtaining the result further includes obtaining a valid unlock command and a valid re-lock command with the result.

6. The method of claim 1 further comprising one of:
   automatically and electronically unlocking the safe door of the SST safe from inside the safe in response to the at least a portion of the code and the user identifier; and
   automatically and electronically locking the safe door from inside the safe in response to the at least a portion of the code and the user identifier.

7. A method, comprising:
   cryptographically communicating initial key information to a Self-Service Terminal (SST) safe over a network connection by providing an encrypted master key over the network connection that is encrypted with a public key of the SST safe; and
   dynamically supplying transactional cryptographic keys to authenticated requestors, each transaction cryptographic key unique to a unique transaction for operating the SST safe made by a unique requestor, and the SST safe can independently reproduce each transactional cryptographic key by processing the initial key information from completely within an inside of the SST safe and utilizing a decrypted version of the encrypted master key that is decrypted with a private key of the SST safe, wherein the private key remains in a secure micro controller within the SST safe, wherein the SST safe processes two-factor authentication for each transaction cryptographic key, completely within the inside of the SST safe, to determine whether to lock or unlock the SST safe from within an inside of the SST safe based on a specific transaction cryptographic key and a requestor identifier for a specific requestor, and wherein the SST safe is opened through a safe door that includes a handle and the safe door is devoid of any holes for affixing the handle to the safe door.

8. The method of claim 7, wherein cryptographically communication further includes wirelessly communicating with a lock drive of the SST safe to supply the initial key information.

9. The method of claim 7, wherein cryptographically communication further includes communicating the initial key information to an SST controller of an SST to which the SST safe is integrated within, the SST controller relaying the initial key information to the SST safe, and wherein the initial key information is encrypted and cannot be decrypted by the SST controller.

10. The method of claim 7, wherein dynamically supplying further includes using verified identifiers associated with the requestors as at least a portion of the transactional cryptographic keys.

* * * * *